Patented Dec. 7, 1926.

1,609,826

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF MAKING ZIRCONIUM COMPOUNDS.

No Drawing.    Application filed October 27, 1925.    Serial No. 65,243.

My invention relates to the derivation of zirconium compounds from the decomposition of zirconium ores and minerals, the most important of which are baddeleyite and zircon (zirconium silicate), which compounds result chiefly in the form of acid zirconium solutions that may be used thereafter in preparing various inorganic and organic salts of zirconium.

The objects of my invention are, among other things, the provision of novel and simplified methods for converting zircon or baddeleyite (containing both zirconium oxide and zirconium silicate) into an acid zirconium solution which may thereafter be utilized and employed for manufacturing various zirconium compounds such as composite opacifying pigments for vitreous enamels or for fabric weighting etc., all at much lower costs than heretofore possible by the use of fusion methods with molten alkalis.

According to my invention the zirconium mineral or zircon is decomposed by mixing same in a finely milled state with a restricted amount of alkali, sodium carbonate for example, yielding a charge which when heated to about 900° C. forms a mass that does not shrink materially and retains to a large extent its dry character, not yielding even a semi-pasty mass. This decomposition will result in the formation of a zirconium compound readily dissolving in dilute acids with the silicon carried into the acid solution along with the zirconium. I have ascertained from experiments that such mass, when disintegrated and leached with dilute sulphuric acid (20%), will usually show 97% decomposition of the zircon in the ore used where equal weights of zircon and sodium carbonate were used. I have also discovered that practically no improvement in zircon decomposition results when the amount of sodium carbonate was increased in proportion to the zircon.

Among the practical advantages of my improved decomposition methods and the derivation of desired zirconium compounds, I will mention the following:—

1. High temperatures are not employed with the charge remaining throughout the period of roasting as a solid mass which may be heated on the floor of a muffle furnace and may be handled as in the customary dry roasting operations.

2. High efficiency in that the charge remains a coherent solid mass so that the solids can not settle out as sometimes occurs in fusion methods; at all times during the roasting operation the zircon is in intimate contact with the reactive alkali.

3. No corrosion in the furnace from excess of molten alkali since in my process the amount of alkali is so limited as to act in a large degree only upon the zircon by which such alkali is held. The lower temperatures used also prevent corrosion with accompanying contamination of the products since alkalis are usually more active at the higher temperatures in the fusion decomposition methods.

4. Economy in the relatively small amount of alkali required, the cost of alkali being considerably less than that of the natural zirconium ores and minerals employed.

5. Adaptability for treating all types of zirconium ores and minerals.

In practicing my improved methods it is of advantage to have the zirconium mineral as free as possible from undesired substances, such as compounds of iron, titanium and rare earths, so as to leave less of these impurities in the resulting acid solution. When baddeleyite is used a pretreatment with hydrochloric or other mineral acid will remove most of the iron. Such pretreatments are usually desirable but do not comprise the essential features of my invention.

My invention may be successfully practiced as follows: I first mill the zirconium ore as fine as 325 mesh usually by the wet process and mix therewith an equal weight of sodium carbonate ($Na_2CO_3$). Other alkalis, such as sodium hydrate, sodium peroxide, and sodium sulphide, or mixtures of these sodium compounds may be used and I have successfully carried out my improved methods of forming a mixture of only 0.6 parts by weight of sodium carbonate to one part of zircon. However I usually use equal parts of zircon and sodium carbonate. This mixture is then roasted at a temperature ranging from 850° C. to 950° C., preferably about 900° C. from one to four hours depending on the character of the particular zirconium ore used and the amount of the charge. When employing the most desirable temperature of 900° C., the mass does not shrink materially and retains to a large extent its dry character not approaching even a semi-pasty condition while the zircon is completely decomposed without any appreciable liberation of zirconium oxide. The mass is then thoroughly disintegrated preferably by placing same in a pebble mill with sufficient water, and when discharged from the mill either of the following treatments may be resorted to.

A. In case of zirconium ores containing impurities such a chromium, manganese, etc., which dissolve in water (after roasting operation), it is necessary to dilute with water and give the material several washes to remove objectional impurities, I prefer to do this as in most cases there is found some chromium, manganese, etc., which if washed out will give less trouble in later treatments. It is also usually desirable to remove the water soluble silicates and aluminates when alumina is present. The residue from this treatment is now treated with a suitable acid depending upon what zirconium compound is desired. Usually I prefer to use sulphuric acid and this can be of any dilution that will effectively dissolve the soluble zirconium and silicon compounds. For instance, I have used sulphuric acid of 60% $H_2SO_4$ strength (by weight). When this is added to the residue after decantation of the water-soluble fraction residue or slurry containing say 400 parts (weight solids to liter of slurry), considerable heat is developed and zirconium and silicon complexes quickly dissolve. Under these conditions the charge will in short time become a stiff mass due to gelatinizing of silica and possibly of zirconium. If desired such a mass can be dried at say about 200° C. to render the silicon compounds insoluble and then by extracting with water about 90% of the zirconium is obtained in solution.

The fraction of zirconium which is insoluble in the acid will in this case remain with the silica and for this reason the following treatment "B" may be preferable.

B. The charge is treated with dilute acid say containing 10% sulphuric acid by weight or of any suitable strength that will dissolve the silicon and soluble zirconium fraction, but which, when the charge is allowed to settle, will not result in the setting up of silicon compounds. Using 10% acid and allowing say one hour for solution of the soluble fraction (the action being slower with this diluter acid), and after no further solvent action is apparent, the charge is allowed to stand at room temperature. It will be found that a more or less granular product settles out leaving a supernatant solution containing practically all the silicon and about 90% of the zirconium in acid solution. This solution is decanted off and the residue is diluted slightly with water or preferably with dilute acid which when decanted can be used in treating a fresh charge. At any rate the residue is washed and dried and when weighed is found to be about 15 parts by weight to 100 of zirconium ore introduced. Upon analysis this residue was found to contain only 15% silica and about 85% zirconia being essentially free of fixed sodium or alkali compounds. This residue can be used as such as a zirconium oxide of fair degree of purity or it may be treated with concentrate $H_2SO_4$, and upon heating will dissolve forming zirconium sulphate which can be leached out leaving the silica or small amount of zirconium silicate insoluble.

The dilute acid solution containing both silica and zirconium in solution may then be evaporated by any suitable means and finally heated at sufficient temperature to render the silica insoluble. Evaporation under reduced pressure and consequent lower temperature is very effective in that the solution can be boiled at say 50° C., and evaporation can be carried much further without the silicon separating out. Such point is reached where silicon compounds begin to separate as will be indicated by appearance of jelly-like aggregates. The charge can at this stage be transferred to another vessel and evaporation continued, or it may be continued in same vessel by simply reducing or entirely cutting out suction and allowing temperature to rise. The heat is preferably applied externally although it can be applied internally by means of coils; however external heat is better adapted to this operation. The charge is finally baked to render the silica insoluble and upon leaching with water and separating the insoluble silicon compound, a solution of zirconium is obtained. A little, say 1% or 2%, of the total zirconium in the charge remains with the silica. It will be seen that by combining the two solutions of zirconium, a recovery of well over 90% of the zirconium in original ore has been accomplished.

I do not wish to restrict myself to use of sulphuric acid in treating residue from initial water washing or residue from roasting operation because if a chloride solution is desired, hydrochloric acid would be used instead of sulphuric acid; or nitric acid might be used, if a nitrate solution were desired. Oxalic or tartaric acid are good solvents for both the silicon and zirconium; in the same sense any acid in which the zirconium is soluble could be used depending upon requirements of case.

In certain cases the water extraction and washing out of water soluble impurities might be eliminated and the disintegrated mass treated directly with acid and treated as in the "A" case, or, the roasted mass from furnace might be dry milled to fine powder and charged directly to acid or worked up with water and acid added. The method best suited to each particular case should be used.

The following example will illustrate the workings of my improved methods:—

The zirconium ore is wet milled to about 325 mesh, or otherwise crushed to such fineness.

To 100 parts zirconium ore about 100 parts sodium carbonate are introduced after milling. This can be added to the wet charge and the whole dried or the zirconium ore can be separately dried and the dry sodium carbonate can be incorporated in any dry way.

The charge is heated to about 900° C., preferably for about three hours, or at any temperature and for any period of time that experience will show give best results with any particular ore. The roasted charge is withdrawn from furnace and preferably cooled. Although I do not confine myself to cooling of charge it might be wetted while warm or hot. The cooled charge is placed in any suitable machine, preferably a pebble mill of intermittent type, and to it is added a suitable amount of water. The mill is run until all aggregates have been broken down and a fine product obtained, this requiring only a few hours. This charge is discharged from mill and diluted with water and after stirring is allowed to stand and the solids to settle. The alkaline solution is then decanted and this operation repeated as often as necessary, depending upon circumstances. If desired, the charge can be filtered and washed. The method is optional.

The washed residue from decantation system of washing, or if in the form of a filter cake, is worked up with water using about three parts water to one of solids.

Dilute acid is then added in amount slightly in excess of that required to normally combine with the fixed sodium and soluble zirconium; for instance, for 100 parts of zirconium ore introduced about 160 parts by weight of actual $H_2SO_4$ may be used, which is diluted to say 10% strength before using. The acid is stirred into charge and stirring is continued until solution has run its full course; then the charge is allowed to settle and the acid liquor containing both zirconium and silicon in solution is decanted. Dilute acid is added to residue and again settled and this decanted liquir can be used in taking up fresh charge.

The acid solution is then evaporated in any suitable way, and the silicon rendered insoluble; then the charge upon leaching with water yields the zirconium in solution.

The zirconium sulphate solution obtained in this manner can be used as a starting point for preparation of other zirconium compounds, such as various salts or the oxide for use as opaquing agent, etc.

I claim as my invention:

1. The method of treating zirconium ores, which comprises mixing said ores with an alkali and heating the charge without fusion but with decomposition of said material resulting in a zirconium compound soluble in dilute acids.

2. The method of treating zirconium ores, which comprises mixing said ores with a substantially equal quantity of an alkali and heating the charge without fusion but with decomposition of said material resulting in a zirconium compound soluble in dilute acids.

3. The method of treating zirconium ores, which comprises mixing said ores with an alkali and heating the charge to between 850° C. and 950° C. without fusing the mass and without material shrinkage thereby resulting in zirconum compound soluble in dilute acids.

4. The method of treating zirconium ores, which comprises mixing said ores with a substantially equal quantity of an alkali and heating the charge to between 850° C. and 950° C. wihout fusing the mass and without material shrinkage thereby resulting in a zirconium compound soluble in dilute acids.

5. The method of treating zirconium ores, which comprises mixing said ores in finely divided form with an alkali and heating the charge without fusion but with decomposition of said material resulting in a zirconium compound soluble in dilute acids.

6. The method of treating zirconium ores, which comprises mixing said ores in finely-divided form with a substantially equal quantity of an alkali and heating the charge without fusion but with decomposition of said material resulting in a zirconium compound soluble in dilute acids.

7. The method of treating zirconium ores, which comprises mixing said ores in finely-divided form with an alkali and heating the charge to between 850° C. and 950° C. without fusing the mass and without material shrinkage thereby resulting in a zirconium compound soluble in dilute acids.

8. The method of treating zirconium ores, which comprises mixing said ores in finely-divided form with a substantially equal quantity of an alkali and heating the charge to between 850° C. and 950° C. without fusing the mass and without material shrinkage thereby resulting in a zirconium compound soluble in dilute acids.

9. The method of converting natural zirconium silicate or zircon into an acid soluble zirconium compound which comprises heating said zircon with an alkali without fusion but with decomposition of the zircon, mixing the roasted product with dilute acid to solution of silicon and soluble zirconium compounds, settling the charge and decanting therefrom the acid liquor containing silicon and zirconium in solution, and drying the residual zirconium compound.

10. The method of converting natural zirconium silicate or zircon into an acid soluble zirconium compound which comprises heating said zircon between 850° C. and 950° C. with a substantially equal quantity of an alkali without fusion but with decomposition of the zircon, mixing the roasted product with dilute acid to solution of silicon and soluble zirconium compounds, settling the charge and decanting therefrom the acid liquor containing silicon and zirconium in solution, and drying the residual zirconium compound.

11. The method of converting natural zirconium silicate or zircon into an acid soluble zirconium compound which comprises heating said zircon with sodium carbonate without fusion but with decomposition of the zircon, mixing the roasted product with dilute acid to solution of silicon and soluble zirconium compounds, settling the charge and decanting therefrom the acid liquor containing silicon and zirconium in solution, and drying the residual zirconium compound.

12. The method of converting natural zirconium silicate or zircon into an acid soluble zirconium compound which comprises heating said zircon between 850° C. and 950° C. with a substantially equal quantity of sodium carbonate without fusion but with decomposition of the zircon, mixing the roasted product with dilute acid to solution of silicon and soluble zirconium compounds, settling the charge and decanting therefrom the acid liquor containing silicon and zirconium in solution, and drying the residual zirconium compound.

13. In the derivation of an acid soluble zirconium compound from zirconium silicate, the steps which consist in mixing sodium carbonate with said silicate and heating the charge to about 900° C. without fusion but with substantial decomposition of said zirconium silicate.

14. In the derivation of an acid soluble zirconium compound from zirconium silicate, the steps which consist in mixing a substantially equal quantity of sodium carbonate with said silicate and heating the charge to about 900° C. without fusion but with substantial decomposition of said zirconium silicate.

15. In treating a zirconium ore to obtain an acid soluble zirconium compound, the step which consists in heating said ore in finely-divided form mixed with a similarly powdered alkali resulting in a dry unfused mass with substantial decomposition of said ore without shrinking the mass.

16. In treating a zirconium ore to obtain an acid soluble zirconium compound, the step which consists in heating said ore in finely-divided form mixed with a similarly powdered alkali resulting in a dry unfused mass with substantial decomposition of said ore without shrinking the mass and forming a zirconium compound soluble in dilute acids.

17. In treating a zirconium ore to obtain an acid soluble zirconium compound, the step which consists in heating said ore in finely-divided form mixed with a substantially equal amount of an alkali to substantial decomposition of said ore without shrinking the mass.

18. In treating a zirconium ore to obtain an acid soluble zirconium compound, the step which consists in heating said ore in finely-divided form mixed with a substantially equal amount of an alkali to substantial decomposition of said ore without shrinking the mass and forming a zirconium compound soluble in dilute acids.

19. In treating a zirconium ore to obtain an acid soluble zirconium compound, the step which consists in heating a finely-divided mixture of said ore and sodium carbonate in substantially equal parts by weight between 850° C. and 950° C. without fusion but with substantial decomposition of zirconium forming a compound soluble in dilute acid.

20. In treating a zirconium ore to obtain an acid soluble compound, the steps which consist in heating said ore mixed with a substantially equal quantity of sodium carbonate without fusion but with substantial decomposition of said ore, leaching the resulting product, and mixing the residue with dilute acid.

21. In treating a zirconium ore to obtain an acid soluble compound, the steps which consist in heating said ore mixed with a substantially equal quantity of sodium carbonate without fusion but with substantial decomposition of said ore, leaching the resulting product, and mixing the residue with dilute sulphuric acid.

CHARLES J. KINZIE.